US011501349B2

(12) United States Patent
Bender et al.

(10) Patent No.: US 11,501,349 B2
(45) Date of Patent: Nov. 15, 2022

(54) ADVERTISEMENT METADATA COMMUNICATED WITH MULTIMEDIA CONTENT

(71) Applicant: INTERNATIONAL BUSINESS MACHINES CORPORATION, Armonk, NY (US)

(72) Inventors: Michael Bender, Rye Brook, NY (US); Jeremy R. Fox, Georgetown, TX (US); Kulvir Singh Bhogal, Fort Worth, TX (US); Shilpa Shetty, Marathahalli (IN)

(73) Assignee: INTERNATIONAL BUSINESS MACHINES CORPORATION, New York, NY (US)

( * ) Notice: Subject to any disclaimer, the term of this patent is extended or adjusted under 35 U.S.C. 154(b) by 0 days.

(21) Appl. No.: 17/103,753

(22) Filed: Nov. 24, 2020

(65) Prior Publication Data

US 2022/0164841 A1    May 26, 2022

(51) Int. Cl.
*G06Q 30/00* (2012.01)
*G06Q 30/06* (2012.01)
(Continued)

(52) U.S. Cl.
CPC ........ *G06Q 30/0613* (2013.01); *G06F 16/48* (2019.01); *G06Q 10/087* (2013.01); *G06Q 30/0185* (2013.01); *G06Q 30/0277* (2013.01); *G06Q 30/0633* (2013.01); *G10L 15/1815* (2013.01); *G10L 15/22* (2013.01); *G10L 2015/223* (2013.01)

(58) Field of Classification Search
None
See application file for complete search history.

(56) References Cited

U.S. PATENT DOCUMENTS 5,899,972 A    5/1999  Miyazawa et al.
2003/0216919 A1    11/2003  Roushar
(Continued)

OTHER PUBLICATIONS

IP.com NPL Search Strategy (Year: 2022).*
(Continued)

*Primary Examiner* — Matthew T Sittner
(74) *Attorney, Agent, or Firm* — Cuenot, Forsythe & Kim, LLC

(57) ABSTRACT

Presentation of multimedia content comprising at least one advertisement and at least a portion of metadata pertaining to the at least one advertisement is detected. A spoken utterance of a user is detected. A computer-understandable meaning of the spoken utterance by performing natural language processing on the spoken utterance. Whether the spoken utterance pertains to a product or service indicated in the at least one advertisement can be determined by comparing the computer-understandable meaning of the spoken utterance to the at least the portion of metadata pertaining to the at least one advertisement and whether the computer-understandable meaning of the spoken utterance indicates that the user chooses to order the product or service indicated in the at least one advertisement can be determined. If both determinations are affirmative, an order for the product or service indicated in the at least one advertisement can be automatically placed.

20 Claims, 9 Drawing Sheets

(51) Int. Cl.
*G06Q 30/02* (2012.01)
*G06F 16/48* (2019.01)
*G10L 15/22* (2006.01)
*G10L 15/18* (2013.01)
*G06Q 10/08* (2012.01)

(56) References Cited

U.S. PATENT DOCUMENTS

| | | | | |
|---|---|---|---|---|
| 2007/0266252 | A1* | 11/2007 | Davis | G10L 19/018 713/176 |
| 2008/0091426 | A1 | 4/2008 | Rempel et al. | |
| 2008/0301135 | A1 | 12/2008 | Alves et al. | |
| 2010/0049619 | A1* | 2/2010 | Beck | G06Q 20/381 705/40 |
| 2014/0133833 | A1* | 5/2014 | Sumler | H04N 5/91 386/278 |
| 2014/0278435 | A1 | 9/2014 | Ganong, III et al. | |
| 2015/0334193 | A1* | 11/2015 | Cho | H04L 67/141 709/218 |
| 2016/0078482 | A1* | 3/2016 | Kennewick, Sr. | G06Q 10/1093 705/14.55 |
| 2016/0301966 | A1* | 10/2016 | Hoder | H04N 21/2541 |
| 2018/0167718 | A1* | 6/2018 | Cha | G06F 3/165 |
| 2019/0297035 | A1* | 9/2019 | Fox | G06Q 50/01 |
| 2019/0336024 | A1* | 11/2019 | Sgobba | A61B 5/316 |
| 2020/0082816 | A1 | 3/2020 | Mahajan | |
| 2021/0280185 | A1* | 9/2021 | Tan | H04N 21/47815 |

OTHER PUBLICATIONS

"Amazon Alexa Official Site: What is Alexa?" [online] Amazon.com, Inc. © 2010—2020 [retrieved Nov. 17, 2020], retrieved from the Internet: <https://developer.amazon.com/en-us/alexa#>, 5 pg.

"Global Intelligent Virtual Assistant Market 2018-2023: Market Value is Projected to Exceed US$ 9 Billion by 2023, Expanding at a CAGR of 32%—ResearchAndMarkets.com," [online] Business Wire, a Berkshire Hathaway Company, Jul. 23, 2018, retrieved from the Internet: <https://www.businesswire.com/news/home/20180723005506/en/Global-Intelligent-Virtual-Assistant-Market-2018-2023-Market>, 3 pg.

Budiu, R. et al., "Intelligent Assistants Have Poor Usability: A User Study of Alexa, Google Assistant, and Siri," [online] Nielsen Norman Group © 1998-2020, Jul. 22, 2018, retrieved from the Internet: <https://www.nngroup.com/articles/intelligent-assistant-usability/>, 21 pg.

* cited by examiner

116

| Advertisement ID | Start Time Stamp | End Time Stamp | Product/Service ID | Product/ Service Description | Tags |
|---|---|---|---|---|---|
| 100120111 | 09:00:02 | 09:00:34 | 0 65000 52268 2 | ABC Blocks | toy, blocks, child, small child, children, ABC .... |
| 100120112 | 09:00:34 | 09:00:49 | 1 64826 65235 6 | Super Knife | super, knife, kitchen, cutlery, sharp, stainless steel, XYZ .... |
| ... | ... | ... | ... | ... | ... |
| 100120120 | 09:58:50 | 09:59:20 | 0 62896 24762 3 | Joe's Glue | glue, adhesive, multipurpose, strong, plastic, metal, joe, joe's .... |

116-1 →  (row 1)
116-2 →  (row 2)
116-10 →  (last row, with 420, 422 braces)

Detect presentation of multimedia content comprising at least one advertisement and detect at least a portion of metadata pertaining to the at least one advertisement
1002

↓

Store, at least temporarily, the at least the portion of metadata pertaining to the at least one advertisement to at least one memory element
1004

↓

Detect a spoken utterance of a user
1006

↓

Responsive to detecting the spoken utterance of the user, derive a computer-understandable meaning of the spoken utterance by performing natural language processing on the spoken utterance
1008

↓

Determine, using a processor, whether the spoken utterance pertains to a product or service indicated in the at least one advertisement by comparing the computer-understandable meaning of the spoken utterance to the at least the portion of metadata pertaining to the at least one advertisement
1010

↓

Determine whether the computer-understandable meaning of the spoken utterance indicates that the user chooses to order the product or service indicated in the at least one advertisement
1012

↓

Responsive to determining that the spoken utterance pertains to the product or service indicated in the at least one advertisement and responsive to determining that the computer-understandable meaning of the spoken utterance indicates that the user chooses to order the product or service indicated in the at least one advertisement, automatically place an order for the product or service indicated in the at least one advertisement
1014

FIG. 10

ADVERTISEMENT METADATA COMMUNICATED WITH MULTIMEDIA CONTENT

BACKGROUND

The present invention relates to data processing systems, and more specifically, to intelligent virtual assistants.

An intelligent virtual assistant (IVA), sometimes referred to as an intelligent personal assistant (IPA), is a software agent configured to perform tasks or services based on commands or questions. For example, IVAs can be used to control home automation devices and media playback via voice. IVAs also can be used to manage other basic tasks, such as e-mail, to-do lists, shopping lists, etc.

SUMMARY

A method includes detecting presentation of multimedia content comprising at least one advertisement and detecting at least a portion of metadata pertaining to the at least one advertisement. The method also can include storing, at least temporarily, the at least the portion of metadata pertaining to the at least one advertisement to at least one memory element. The method also can include detecting a spoken utterance of a user. The method also can include, responsive to detecting the spoken utterance of the user, deriving a computer-understandable meaning of the spoken utterance by performing natural language processing on the spoken utterance. The method also can include determining, using a processor, whether the spoken utterance pertains to a product or service indicated in the at least one advertisement by comparing the computer-understandable meaning of the spoken utterance to the at least the portion of metadata pertaining to the at least one advertisement. The method also can include determining whether the computer-understandable meaning of the spoken utterance indicates that the user chooses to order the product or service indicated in the at least one advertisement. The method also can include, responsive to determining that the spoken utterance pertains to the product or service indicated in the at least one advertisement and responsive to determining that the computer-understandable meaning of the spoken utterance indicates that the user chooses to order the product or service indicated in the at least one advertisement, automatically placing an order for the product or service indicated in the at least one advertisement.

A system includes a processor programmed to initiate executable operations. The executable operations include detecting presentation of multimedia content comprising at least one advertisement and detecting at least a portion of metadata pertaining to the at least one advertisement. The executable operations also can include storing, at least temporarily, the at least the portion of metadata pertaining to the at least one advertisement to at least one memory element. The executable operations also can include detecting a spoken utterance of a user. The executable operations also can include, responsive to detecting the spoken utterance of the user, deriving a computer-understandable meaning of the spoken utterance by performing natural language processing on the spoken utterance. The executable operations also can include determining whether the spoken utterance pertains to a product or service indicated in the at least one advertisement by comparing the computer-understandable meaning of the spoken utterance to the at least the portion of metadata pertaining to the at least one advertisement. The executable operations also can include determining whether the computer-understandable meaning of the spoken utterance indicates that the user chooses to order the product or service indicated in the at least one advertisement. The executable operations also can include, responsive to determining that the spoken utterance pertains to the product or service indicated in the at least one advertisement and responsive to determining that the computer-understandable meaning of the spoken utterance indicates that the user chooses to order the product or service indicated in the at least one advertisement, automatically placing an order for the product or service indicated in the at least one advertisement.

A computer program product includes one or more computer readable storage mediums having program code stored thereon, the program code stored on the one or more computer readable storage mediums collectively executable by a data processing system to initiate operations. The operations include detecting presentation of multimedia content comprising at least one advertisement and detecting at least a portion of metadata pertaining to the at least one advertisement. The operations also can include storing, at least temporarily, the at least the portion of metadata pertaining to the at least one advertisement to at least one memory element. The operations also can include detecting a spoken utterance of a user. The operations also can include, responsive to detecting the spoken utterance of the user, deriving a computer-understandable meaning of the spoken utterance by performing natural language processing on the spoken utterance. The operations also can include determining whether the spoken utterance pertains to a product or service indicated in the at least one advertisement by comparing the computer-understandable meaning of the spoken utterance to the at least the portion of metadata pertaining to the at least one advertisement. The operations also can include determining whether the computer-understandable meaning of the spoken utterance indicates that the user chooses to order the product or service indicated in the at least one advertisement. The operations also can include, responsive to determining that the spoken utterance pertains to the product or service indicated in the at least one advertisement and responsive to determining that the computer-understandable meaning of the spoken utterance indicates that the user chooses to order the product or service indicated in the at least one advertisement, automatically placing an order for the product or service indicated in the at least one advertisement.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 4 depicts examples of advertisement metadata.

FIG. 10 is a flowchart illustrating an example of a method of placing an order for a product presented in an advertisement.

DETAILED DESCRIPTION

Figure 1:
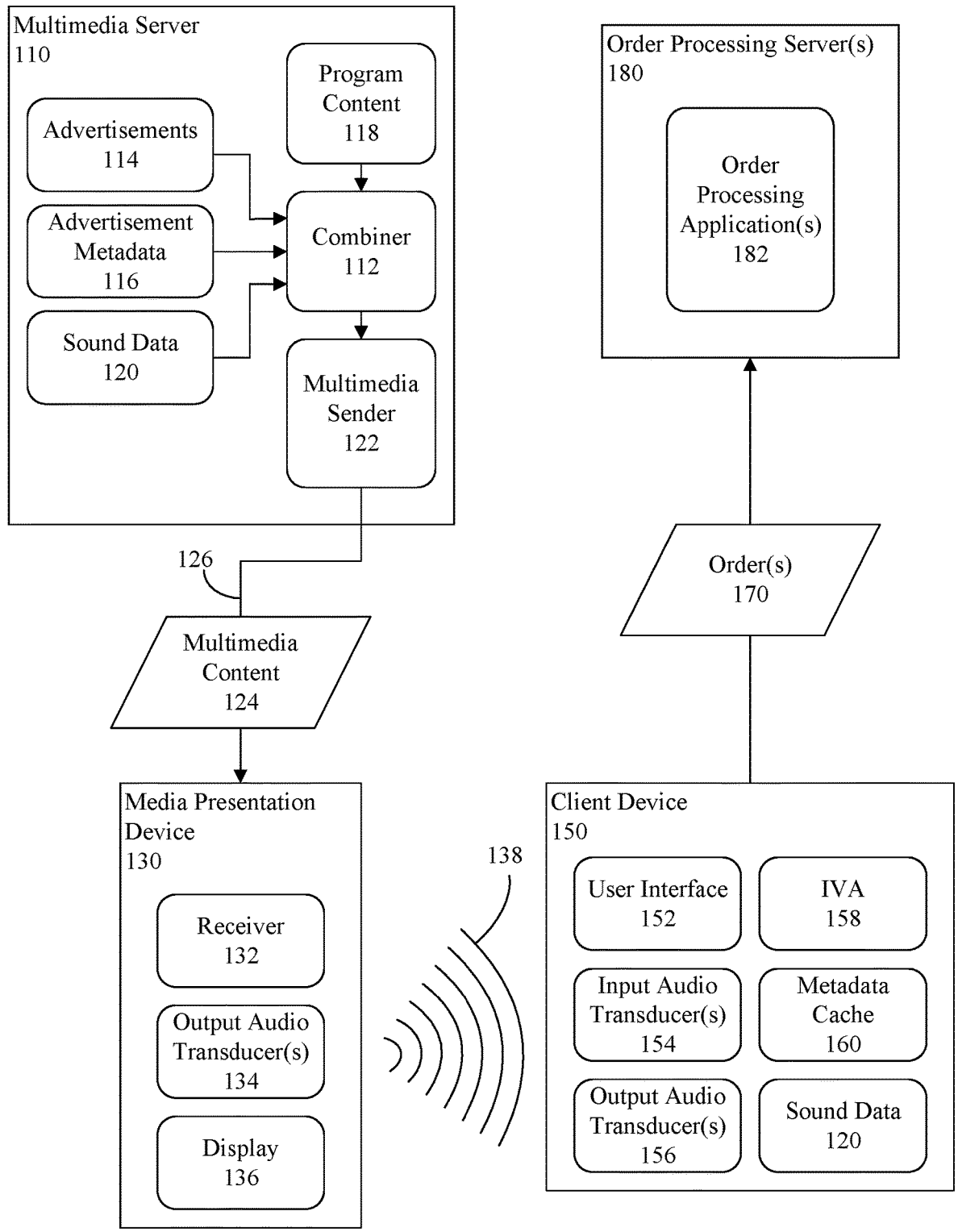
FIG. 1 is a block diagram illustrating an example of a multimedia content communication system.

The arrangements described herein are directed to computer technology, and provide an improvement to computer technology. Specifically, the present arrangements improve automation of placing orders for products or services presented in advertisements contained in multimedia content that is delivered to media presentation devices. In this regard, the present arrangements add advertisement metadata pertaining to the products or services in the multimedia content. An intelligent virtual assistant (IVA) is utilized to detect the advertisement metadata and store the advertisement metadata to a metadata cache. If a user requests the IVA to order a product or service presented in an advertisement, the IVA can automatically place an order for the product or service based on the detected advertisement metadata stored in the metadata cache.

Several definitions that apply throughout this document now will be presented.

As defined herein, the term "multimedia content" means content, comprising audio and/or video, configured to be communicated to at least one media presentation device.

As defined herein, the term "program content" means multimedia content with which one or more advertisements are to be combined.

As defined herein, the term "advertisement" means multimedia content advertising a product or service.

As defined herein, the term "advertisement metadata" means metadata pertaining to an advertisement.

As defined herein, the term "audio signal" means a representation of sound using either a level of electrical voltage for analog signals, or a series of binary numbers for digital signals representing analog signals. The sound need not be in a frequency range audible to human beings.

As defined herein, the term "server" means a data processing system configured to share services with one or more other data processing systems.

As defined herein, the term "media presentation device" means a device that presents multimedia content via at least one output audio transducer. A media presentation device also may present multimedia content via a display. For example, a media presentation device may present an audio portion of a media presentation via one or more output audio transducers and present a video portion of the media presentation via a display. Examples of a media presentation device include, but are not limited to, a television, a multimedia projection system, an audio playback system (e.g., a radio, a stereo system, etc.), a mobile computer, a laptop computer, a netbook computer, a tablet computer, a smart phone, a smart watch, smart glasses, a gaming device, a workstation, a desktop computer, a computer terminal, and the like. Network infrastructure, such as servers, routers, firewalls, switches, access points and the like, are not media presentation devices as the term "media presentation device" is defined herein.

As defined herein, the term "client device" means a data processing system that requests shared services from a server, and with which a user directly interacts via a user interface. Network infrastructure, such as servers, routers, firewalls, switches, access points and the like, are not client devices as the term "client device" is defined herein.

As defined herein, the term "intelligent virtual assistant," also referred to herein by the acronym "IVA," means a software agent, executed by a client device, configured to perform tasks or services based on commands or questions. Network infrastructure, such as servers, routers, firewalls, switches, access points and the like, are not intelligent virtual assistants as the term "intelligent virtual assistant" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example of a multimedia content communication system (hereinafter "system") 100. The system 100 can include a multimedia server 110 and at least one media presentation device 130. The multimedia server 110 can be configured to communicate multimedia content 124 to the media presentation device 130, as well as other media presentation devices (not shown), via at least one communication medium 126. The communication medium 126 is the medium used to communicate multimedia content 124 within the system 100. The communication medium 126 may include connections, such as wire, wireless communication links, or fiber optic cables. The communication medium 126 can be implemented as, or include, any of a variety of different communication technologies such as a wireless television broadcast system, a satellite television system, a wired television communication system (e.g., a cable television system), a wide area network (WAN), a local area network (LAN), a wireless network, a mobile network, a Virtual Private Network (VPN), the Internet, the Public Switched Telephone Network (PSTN), or similar technologies. By way of example, the multimedia sender 122 can communicate the multimedia content 124 as a television broadcast, using cable television communications, via one or more satellites, by streaming the multimedia content 124 over the Internet, and/or the like.

The multimedia server 110 can include a combiner 112 configured to combine advertisements 114 and at least a portion of advertisement metadata 116 with program content 118. Each advertisement metadata 116 can pertain to a product or service presented in an advertisement 114. In illustration, the combiner 112 can add one or more advertisements 114 and corresponding advertisement metadata 116 to a beginning of the program content 118, add one or more advertisements 114 and corresponding advertisement metadata 116 to an end of the program content 118, and/or parse (e.g., divide) the program content 118 into a plurality of segments and insert one or more advertisements 114 and corresponding advertisement metadata 116 between respective segments of the program content 118.

Figure 2:
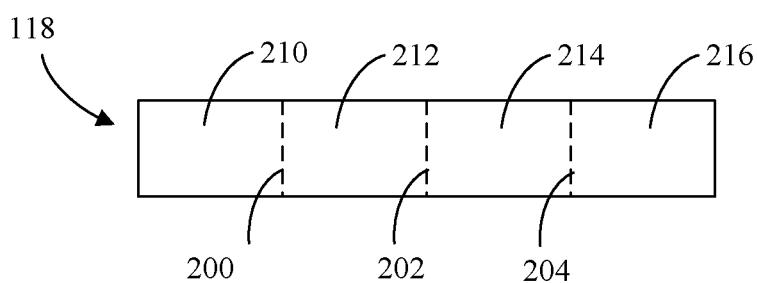
FIG. 2 depicts an example of parsing program content into a plurality of segments.

Referring to FIG. 2, in a non-limiting arrangement, the program content 118 can be configured with pre-defined segmentation markers 200, 202, 204 indicating where the program content 118 can be divided into segments 210, 212, 214, 216. The segmentation markers 200-204 can include, for example, time stamps and/or other metadata indicating where the program content 118 can be divided into segments 210, 212, 214, 216. In another non-limiting arrangement, the combiner 112 can choose where to parse the program content 118 into the segments 210, 212, 214, 216. For example, the combiner 112 can determine parse the program content 118 after each of one or more specified durations of playback time of the program content 118. In another example, the combiner 112 can include a multimedia analyzer that analyzes the program content 118 to identify scene changes in the program content, and the combiner 112 can determine parse the program content 118 at the scene changes. Still, the combiner 112 can divide the program content 118 into the segments 210, 212, 214, 216 in any other suitable manner and the present arrangements are not limited in this regard.

Figure 3:
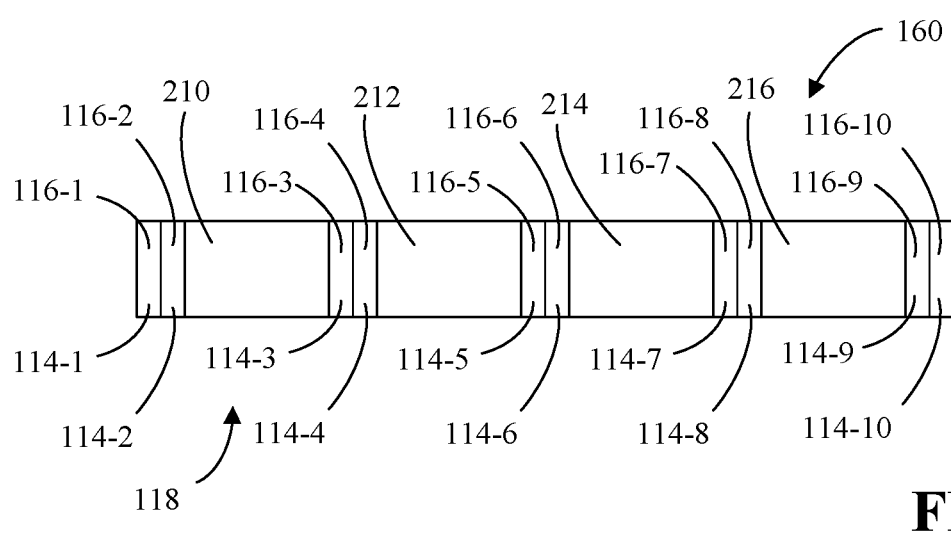
FIG. 3 depicts an example of advertisements and advertisement metadata added to program content.

FIG. 3 depicts an example of the advertisements 114 and at least a portion of the advertisement metadata 116 combined with the program content 118 to generate the multimedia content 124. In this example, advertisements 114-1, 114-2 and at least a portion of the advertisement metadata 116-1, 116-2 can be added to a beginning of the program content 118, advertisements 114-3, 114-4 and at least a portion of the advertisement metadata 116-3, 116-4 can be inserted between the segments 210, 212, advertisements 114-5, 114-6 and at least a portion of the advertisement metadata 116-5, 116-6 can be inserted between the segments 212, 214, advertisements 114-7, 114-8 and at least a portion of the advertisement metadata 116-7, 116-8 can be inserted between the segments 214, 216, and advertisements 114-9, 114-10 and at least a portion of the advertisement metadata 116-9, 116-10 can be added to the end of the program content 118. The present arrangements are not limited to this example, however. For instance, fewer or more advertisements 114 and advertisement metadata 116 can be combined with the program content 118.

FIG. 4 depicts examples of advertisement metadata 116. The advertisement metadata 116 can include, for each advertisement metadata 116-1-116-10, a plurality of fields. For example, the advertisement metadata 116 can include, for each advertisement metadata 116-1-116-10, an advertisement identifier 400. The advertisement identifier 400 can indicate a unique identifier, comprising alphanumeric characters and/or symbols, for the advertisement to which the advertisement metadata 116 pertains. By way of example, each advertisement identifier 400 can include a date code 420 indicating a date the advertisement 114 is presented and a sequence number 422 indicating the advertisement 114 in a sequence of advertisements 114 presented on that date. The advertisement metadata 116 also can include, for each advertisement metadata 116-1-116-10, a start time stamp 402 indicating a time the respective advertisement 114-1-114-10 is to begin and an end time stamp 404 indicating a time the respective advertisement 114-1-114-10 is to end.

The combiner 112 can automatically determine the advertisement identifier 400 and time stamps 402, 404 for each advertisement metadata 116 when adding the advertisement metadata 116 to a respective advertisement 114. In illustration, the combiner can interface with a system clock (e.g., operating system clock or Internet based clock) to acquire the date code 420 and time stamps 402, 404 during the process of adding the advertisement metadata 116 to the respective advertisement 114-1-114-10. As the combiner 112 adds the advertisement metadata 116 to a respective advertisement 114-1-114-10, the combiner 112 can automatically assign the sequence numbers 422 to the advertisement metadata 116-1-116-10 based on a sequential order in which the respective advertisement 114-1-114-10 are presented, for instance on the date the advertisements 114 are presented.

The advertisement metadata 116 also can include, for each advertisement metadata 116-1-116-10, a product/service identifier 406 that uniquely identifies the product and/or service presented in the respective advertisement 114-1-114-10. The product/service identifier 406 can be, for example, a universal product code (UPC) assigned to the product or service. The product/service identifier 406 can be used by the media presentation device 130 to use the product/service identifier 406 to identify the product or service when placing an order for the product or service, which will be described herein. The advertisement metadata 116 also can include, for each advertisement metadata 116-1-116-10, a product/service description 408 that uniquely describes the product or service advertised in the respective advertisement 114-1-114-10. Further, the advertisement metadata 116 also can include, for each advertisement metadata 116-1-116-10, one or more tags 410 assigned to the product or service advertised in the respective advertisement 114-1-114-10. The product/service description 408 and tags 410 can be used by the media presentation device 130 to identify the product or service that is advertised based on a spoken utterance of a user, which will be described herein.

The product/service identifier 406, product/service description 408 and tags 410 for each for each advertisement metadata 116-1-116-10 can be specified based on the respective advertisement 114-1-114-10 to which the advertisement metadata 116-1-116-10 pertains. In illustration, a system administrator can add data for the fields 406-410 to records, of a data table, assigned to the respective products or services, and add data to another data table assigning each advertisement metadata 116-1-116-10 to advertisements 114 to which the advertisement metadata 116-1-116-10 pertain. In real time when generating multimedia content 124, the combiner 112 can access the data tables to select the data for the fields 406-410 in the respective advertisement metadata 116-1-116-10 during the process of adding the advertisement metadata 116-1-116-10 to the respective advertisements 114-1-114-10.

The multimedia server 110 can store the advertisement metadata 116-1-116-10 locally to memory elements (e.g., to a bulk storage device) and/or store the advertisement metadata 116-1-116-10 to a storage location accessible by client devices and/or media presentation devices, for example to a database hosted by another server (e.g., a cloud-based server) accessible via the Internet or another suitable communication medium.

Referring to FIGS. 1, 3 and 4, in a non-limiting arrangement, the combiner 112 can add at least a portion of the advertisement metadata 116-1-116-10 to the respective advertisements 114-1-114-10, in the multimedia content 124, to be in the form of audio signals. Such audio signals can represent sounds that are not audible to a human being. A sound that is not audible to a human being can be, for example, a sound that is at a frequency that is above a maximum frequency audible to a human being. In illustration, a minimum frequency of the sound can be equal to or greater than 16 kHz, equal to or greater than 17 kHz, equal to or greater than 18 kHz, equal to or greater than 19 kHz, equal to or greater than 20 kHz, equal to or greater than 21 kHz, equal to or greater than 22 kHz, etc. The frequency of the sound also can be at or below a maximum frequency that is higher than the minimum frequency. For example, the maximum frequency of the sound can be equal to or less than a maximum frequency at which the media presentation device 130 is configured to process audio signals. In illustration, the maximum frequency of the sound can be equal to or less than 30 kHz, equal to or less than 29 kHz, equal to or less than 28 kHz, equal to or less than 27 kHz, equal to or less than 26 kHz, equal to or less than 25 kHz, equal to or less than 24 kHz, equal to or less than 23 kHz, equal to or less than 22 kHz, equal to or less than 21 kHz, equal to or less than 20 kHz, etc., so long as the maximum frequency is higher than the minimum frequency. In an arrangement, the audio signals can be added to the advertisements 114, for example in a baseband signal of the multimedia stream, before the baseband signal is modulated and/or digitally encoded into a communication signal. The media presentation device 130 can detect the audio signal in the communication signal, for example after demodulation of the communication signal into a baseband signal and/or after digital to analog conversion of digital data contained in the communication signal.

In an example, the non-audible audio signals including advertisement metadata 116 can be analog audio signals. In illustration, the combiner 112 can identify and access sound data 120. Each sound data 120 can be assigned to a product or service, or a family of products or services. The sound data 120 can be stored, for example, in a database. The database can be located on the multimedia server 110 or located on another device or system to which the multimedia server 110 is communicatively linked. For example, the sound data 120 can be stored to a cloud-based server configured to be accessible to the multimedia server 110, as well as client devices and media presentation devices. The sound data 120 can include non-audible sounds representing words, characters and/or symbols corresponding to at least a portion of the advertisement metadata 116. The non-audible sounds can be, for example, between the minimum frequency and the maximum frequency (e.g., between 20 kHz and 22 kHz).

In an example, the sound data 120 can include a non-audible audio signal converted from respective advertisement metadata 116 for a product or service, or a family of products or services, being advertised in the advertisements 114. For example, the non-audible audio signal can include sounds correlated to a product/service identifier 406 indicated in the advertisement metadata 116 for a product or service presented in the advertisement 114. When combining an advertisement 114 with program content 118, the combiner 112 can add that non-audible audio signal representing the product/service identifier 406 to the audio portion of the advertisements 114.

In another example, the combiner 112 can process the advertisement metadata 116 to identify, in addition to the product/service identifier 406, other words, characters and/or symbols contained in the advertisement metadata 116, for example data in fields 400-404 and 408-410, and use the sound data 120 to convert those words, characters and/or symbols into a non-audible audio signal. The combiner 112 can add the resulting audio signal to the audio portions of the advertisements 114.

In another example, the audio signals representing the advertisement metadata 116 can be digital audio signals. In illustration, the combiner 112 can include an encoder that encodes the product/service identifier 406 and, optionally, data from fields 400-404 and 408-410 of the advertisement metadata 116, into a digital signal having a baud rate between the minimum frequency and the maximum frequency (e.g., a baud rate between 20 kBd and 22 kBd). Again, the combiner 112 can add the resulting signal to the audio signal portions of the advertisements 114.

In another non-limiting arrangement, the combiner 112 can add at least a portion of the advertisement metadata 116-1-116-10 (e.g., the product/service identifier 406 or data from fields 400-410) to the respective advertisements 114-1-114-10, in the multimedia content 124, to be in the form of digital data distinct from the audio signals of the advertisements 114. For example, the combiner 112 can digitally encode the advertisement metadata 116-1-116-10 into the respective advertisements 114-1-114-10.

Referring again to FIG. 1, the multimedia server 110 can include a multimedia sender 122. The combiner 112 can communicate to the multimedia sender 122 the multimedia content 124, including the program content 118, advertisements 114 and a non-audible signals representing the advertisement metadata 116 for the respective advertisements 114. The multimedia sender 122 can communicate the multimedia content 124 to the media presentation device 130 via the communication medium 126. The media presentation device 130 can be, for example, a television, a mobile computer, a laptop computer, a netbook computer, a tablet computer, a smart phone, a smart watch, smart glasses, a gaming device, a workstation, a desktop computer, a computer terminal, or the like.

The media presentation device 130 can include a receiver 132 configured to receive multimedia content, including the multimedia content 124, communicated via the communication medium 126. The receiver 132 can be, for example, a television receiver, a modem, a satellite receiver, a network adapter, etc. The receiver 132 can convert the multimedia content 124 from the form in which the multimedia content 124 is communicated over the communication medium 126 to a form that may be processed by the media presentation device 130 for presentation to a user. For example, the receiver 132 can perform demodulation, digital to analog (D/A) conversion, etc. on a received signal carrying the multimedia content 124. Optionally, the media presentation device 130 can include a multimedia storage device (e.g., a digital video recorder) configured to store the received multimedia content 124 to make the multimedia available for presentation to a user at a later time.

The media presentation device 130 also can include one or more output audio transducers 134 (e.g., loudspeakers), or can be communicatively coupled to an audio playback system (e.g., stereo system) that includes one or more output audio transducers 134. Optionally, the media presentation device 130 can include a display 136. The media presentation device 130 can present the multimedia content 124 via the output audio transducers 134 and, optionally, the display 136. For example, the media presentation device 130 can present an audio portion of the multimedia content 124 via the output audio transducer(s) 134 and, optionally, present a video portion of the multimedia content 124 via the display 136. The presentation of the audio portion of the multimedia content 124 via the output audio transducer(s) 134 can generate acoustic signals 138. The acoustic signals 138 can include, in addition to audio of the advertisements 114, sounds, not audible to a human being, that represent at least a portion of the advertisement metadata 116. In this regard, the sounds can include at least a portion of the advertisement metadata 116 in the form of an audio signal that is not audible to human beings.

The system 100 further can include a client device 150. The client device 150 can include a user interface 152, at least one input audio transducer 154 (e.g., a microphone), at least one output audio transducer 156 (e.g., a loudspeaker), an intelligent virtual assistant (IVA) 158 and a metadata cache 160. The user interface 152 also can include software, executable by an operating system of the client device 150, with which a user directly interacts, for example using spoken utterances, a keyboard, a keypad, a mouse, a touch screen, etc.

The client device 150 can continually monitor for audio signals generated by the input audio the input audio transducer(s) 154 in response to the input audio transducer(s) 154 detecting acoustic signals. The input audio transducer(s) 154 can detect the acoustic signals 138 generated by the output audio transducer(s) 134 of the media presentation device 130. Via the detection of the acoustic signals 138 by the input audio transducer(s) 154, the IVA 158 can monitor presentation of the multimedia content 124 by the media presentation device 130 and detect non-audible audio signals contained in the multimedia content 124, and thus contained in the acoustic signals 138. The IVA 158 can access the sound data 120, for example from a copy of the sound data 120 stored locally by the client device 150, from the multimedia server 110, or from another server, and use the sound data 120 to identify the advertisement metadata 116 corresponding to the non-audible audio signals contained in the multimedia content 124. In another arrangement, the IVA 158 can be configured to convert the non-audible audio signals into the advertisement metadata 116.

In illustration, the IVA 158 can monitor the acoustic signals 138 and detect audio signals representing sounds that are not audible to a human being. In an arrangement in which the advertisement metadata 116 is presented in the form of non-audible analog audio signals, the IVA 158 can use the sound data 120 to convert the non-audible analog audio signals into text or another digital representation of the advertisement metadata 116, or identify in the sound data 120 the advertisement metadata 116 corresponding to a detected non-audible signals. The client device 150 can store a copy of the sound data 120 locally to memory elements or can access the sound data 120 from a server (e.g., the multimedia server 110) via the Internet. In an arrangement in which the advertisement metadata 116 is presented in the form of digital audio signals, the IVA 158 can be configured to detect and process the digital audio signals to identify the advertisement metadata 116.

By way of example, in an arrangement in which the non-audible audio signal for an advertisement 114 includes the product/service identifier 406, but not all of the advertisement metadata 116 for that advertisement 114, the IVA 158 can access the sound data 120 to identify the product/service identifier 406 corresponding to the non-audible audio signal. Alternatively, the IVA 158 can convert the non-audible audio signal into the product/service identifier 406 using a suitable algorithm. The IVA 158 can include the product/service identifier 406 in a query communicated to the multimedia server 110, or another server hosting the advertisement metadata 116, to access the advertisement metadata 116.

In an arrangement in which the non-audible audio signal for an advertisement 114 includes the product/service identifier 406 and additional fields 400-404 and 408-410 the advertisement metadata 116 for that advertisement 114, the IVA 158 can access the sound data 120 to identify the product/service identifier 406 and additional portions the advertisement metadata 116. Alternatively, the IVA 158 can convert the non-audible audio signal into the product/service identifier 406 and additional fields 400-404 and 408-410 the advertisement metadata 116 using a suitable algorithm.

The IVA 158 can store the advertisement metadata 116 (e.g., the product/service identifier 406 and, optionally, the additional fields 400-404 and 408-410 the advertisement metadata 116), at least temporarily, to the metadata cache 160. The metadata cache 160, for example, can be a data storage location in a local memory or a local bulk storage device.

The IVA 158 can store the advertisement metadata 116 for each advertisement 114 in the metadata cache 160 for a threshold period of time (e.g., 1 hour, 2 hours, 3 hours, 4 hours, 5 hours, 6 hours, 12 hours, 24 hours, etc.). For example, the IVA 158 periodically can delete from the metadata cache 160 advertisement metadata 116 that is older than the threshold period of time. In illustration, each time the IVA 158 detects and stored advertisement metadata 116 responsive to presenting a corresponding advertisement 114, the IVA 158 can add to the metadata a playback time stamp indicating when the advertisement is presented by the media presentation device 130. In another arrangement, the IVA 158 can replace the start time stamp 402 and end time stamp 404 (FIG. 4) with new time stamps indicating when playback of the corresponding advertisement 114 via the media presentation device 130 begins and ends, respectively. Based on the time stamp(s), the IVA 158 periodically (e.g., every 30 minutes, 1 hour, 2 hours, etc.) can identify advertisement metadata 116 for advertisements 114 that were presented by the media presentation device 130 longer ago than the threshold period of time, and purge that advertisement metadata 116 from the metadata cache 160. For instance, the IVA 158 can purge from the metadata cache 160 advertisement metadata 116 for advertisements 114 that were presented more than 1, 2, 3, 4, 5, 6, 12, 24, etc. hours ago.

The IVA 158 can monitor the user interface 152 to detect spoken utterances of a user detected by the input audio transducer(s) 154. In an arrangement, the IVA 158 can implement natural language processing (NLP) and semantic analysis on the spoken utterances in order to derive a computer-understandable meaning of the spoken utterances. In another arrangement, the IVA 158 can interface with another system (not shown), for example via the Internet, that implements the NLP and semantic analysis on the spoken utterances for the IVA 158. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the IVA 158 (or other system to which the IVA 158 is communicatively linked) to implement NLP and semantic analysis.

In illustration, a user can utter instructions to the IVA 158 to order a product or service presented in an advertisement 114. Via the spoken utterances, the user can provide any of a variety of information that may be used to identify the product or service. Specifically, the IVA 158 can compare the computer-understandable meaning of the spoken utterances to various data contained in the advertisement metadata 116 stored in the metadata cache 160 in order to identify the product or service.

In illustration, the user may utter "order super knife." In response, the IVA 158 can compare the term "super knife" to the advertisement metadata 116 and identify the advertisement metadata 116-2 (FIG. 4) that includes the term "Super Knife" in the product/service description 408. The IVA 158 also can identify data contained in the advertisement metadata 116-2. Using speech synthesis, the IVA 158 can generate an audio signal comprising synthesized speech and output the audio signal via the output audio transducer 156, for example via the user interface 152. The synthesized speech can ask the user to confirm the order. For example, the IVA 158 can determine when the corresponding advertisement was presented by the media presentation device 130 based on one or more of the previously described time stamps, and the synthesized speech can state "You wish to order the Super Knife in the advertisement presented thirty-six minutes ago. Is that correct?" The IVA 158 can monitor for a user response, for example a spoken utterance indicating "yes." Responsive to the user confirming the order, the IVA 158 can identify the product/service identifier 406 for that product in the advertisement metadata 116-2 and place an order 170 for the product, using the product/service identifier 406, to an order processing server 180. For example, the client device 150 can communicate the order 170 to the order processing server 180 via the Internet or any other suitable communication medium. An order processing application 182 of the order processing server 180 can receive the order 170 and enter the order for processing and fulfillment.

In another example, the user can utter "order the glue that was in the last commercial." In response, based on the computer-understandable meaning of that spoken utterance, the IVA 158 can identify advertisement metadata 116-10 that includes the term "glue" as a tag 410 and/or includes the term "glue" in the product/service description 408. The IVA 158 can prompt the user to confirm whether the user wishes to order the product indicated by that advertisement metadata 116-10, and order the product responsive to the user confirming to do so.

In another example, the user can utter "order the toy advertised about 8 or 9 commercials ago." In response, based on the computer-understandable meaning of the spoken utterance, the IVA 158 can search the advertisement metadata 116 to identify advertisement metadata 116-1 that includes the tag 410 "toy" and that is listed sequentially in the metadata cache 160 as a record that is within a threshold number of records from 8 and 9 records previous to the most recent advertisement metadata record. For example, by querying the advertisement identifiers 400 in the advertisement metadata 116 and identifying the sequence numbers 422, the IVA 158 can search for records within +/−2 records of 8 and 9 records back in the metadata cache 160. The IVA 158 can prompt the user to confirm whether the user wishes to order the product indicated by that advertisement metadata 116-1, and order the product responsive to the user confirming to do so.

In a further example, the user can utter "order the toy blocks advertised about an hour ago."." In response, based on the computer-understandable meaning of the spoken utterance, the IVA 158 can search the advertisement metadata 116 to identify advertisement metadata 116-1 that includes the tags 410 "toy" and "blocks" and which includes a time stamp indicating an advertisement that was presented within a threshold period of time from one hour ago. For instance, the IVA 158 can query the time stamps 402, 404, or one or more time stamps added to the advertisement metadata 116 by the IVA 158, in the advertisement metadata 116 to identify advertisements presented+/−15 minutes from one hour ago (e.g., between 45 and 75 minutes ago). The IVA 158 can prompt the user to confirm whether the user wishes to order the product indicated by that advertisement metadata 116-1, and order the product responsive to the user confirming to do so.

The IVA 158 can be configured with personalization settings, for example using one or more user profiles. Users can configure the personalization settings via the user interface 152 and/or via one or more other devices to which the client device 150 is communicatively linked, for example via a smart phone, a computer or a tablet computer. Via the personalization settings the IVA 158 can selectively determine which users are authorized to place orders via the IVA 158, and only place orders 170 for order requests placed by those users.

The IVA 158 can place orders 170 using one or more customer accounts indicated in the personalization settings. For example, the personalization settings can indicate one or more vendors and, for each vendor, one or more user identifiers and passwords used to place orders with that vendor. In response to an authorized user requesting the IVA 158 to place on order 170, the IVA 158 can query, in real time, one or more order processing applications 182 to determine which vendors offer the product or service the user chooses to order. The IVA 158 also can query, in real time, the order processing applications 182 to determine the price and delivery time for the price or service. Via the output audio transducer(s) 156 the IVA 158 can indicate to the user, using speech synthesis, which vendors provide the product or service and, for each vendor, the price and deliver time. The IVA 158 can monitor the input audio transducer(s) 154, via the user interface 152, for received spoken utterances of the user selecting a vender with which to place the order 170, and place the order 170 with the selected vendor.

Responsive to determining that the user does not have an account established with a vendor with which the user chooses to place the order 170, the IVA 158 can prompt the user to establish an account with that vendor and/or provide the user with an option to place the order with a vendor for which the user has an existing user account established and that provides the product or service. If the user chooses to establish a new account with a vendor, the IVA can interface with an account setup application of the vendor to receive indications of what data (e.g., user identifier, password, etc.) is required to establish a new user account. Via the user interface 152/output audio transducer(s) 156, the IVA 158 can prompt the user to utter such data. Via the input audio transducer(s) 254/user interface 152 the IVA 158 can detect the user utterances using speech recognition and communicate the corresponding data to the account setup application to establish the user account. Alternatively, the IVA 158 can prompt the user to enter data via another device, for example a smart phone, tablet computer or computer. Responsive to the new user account being established with the vendor, the IVA 158 can place the order 170 with the vendor.

Figure 5:
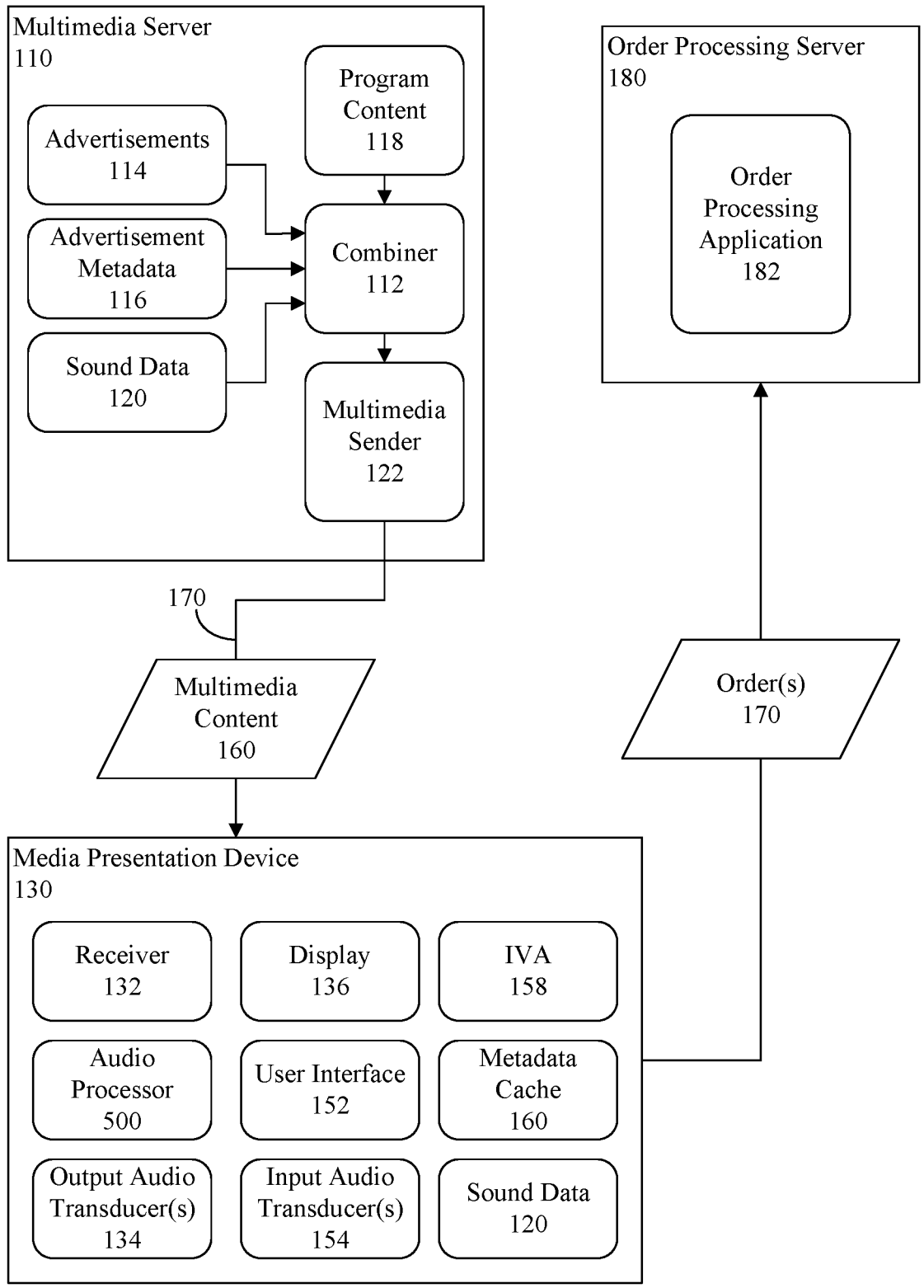
FIG. 5 is a block diagram illustrating another example of a multimedia content communication system.

FIG. 5 is a block diagram illustrating another example of the system 100. In this example, the media presentation device 130 can include the user interface 152, the input audio transducer 154, the IVA 158, the metadata cache 160 and the sound data 120. In a non-limiting arrangement, one or more of the user interface 152, the input audio transducer 154, the IVA 158, the metadata cache 160 and the sound data 120 can be components of an accessory of the media presentation device 130. For example, the input audio transducer 154 can be a component of a remote control used with the media presentation device 130.

In an arrangement, the IVA 158 can communicatively link to an audio processor 500 of the media presentation device 130 and monitor audio signals output by audio processor 500. The IVA 158 can detect the audio signals representing sounds that are not audible to a human being to determine the advertisement metadata 116. Again, the IVA 158 can store the advertisement metadata 116 to the metadata cache 160 for use in identifying advertised products and/or services and placing product and/or service orders, for example as previously described.

In another arrangement, for example an in which the advertisement metadata 116 is presented in the form of digital data distinct from the audio signals of the advertisements 114, the IVA 158 can be configured to process the multimedia content output by the receiver 132 in order to detect and process the digital data to determine the advertisement metadata 116. Again, the IVA 158 can store the advertisement metadata 116 to the metadata cache 160 for use in identifying advertised products and/or services, placing product and/or service orders, establishing user accounts, etc., for example as previously described.

Figure 6:
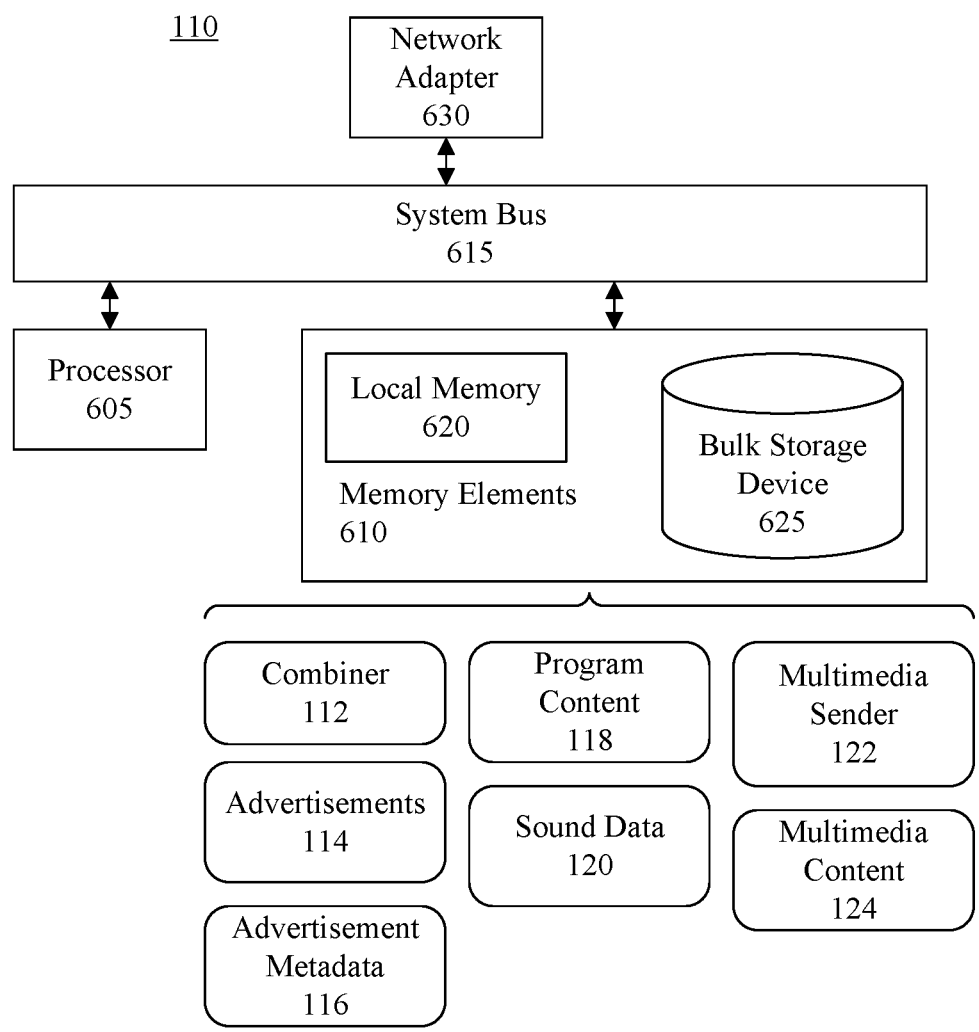
FIG. 6 is a block diagram illustrating example architecture for a multimedia server.

FIG. 6 is a block diagram illustrating example architecture for a multimedia server 110 of FIGS. 1 and 5. The multimedia server 110 can include at least one processor 605 (e.g., a central processing unit) coupled to memory elements 610 through a system bus 615 or other suitable circuitry. As such, the multimedia server 110 can store program code within the memory elements 610. The processor 605 can execute the program code accessed from the memory elements 610 via the system bus 615. It should be appreciated that the multimedia server 110 can be implemented in the form of any system including a processor and memory that is capable of performing the functions and/or operations described within this specification. For example, the multimedia server 110 can be implemented as a server, a plurality of communicatively linked servers, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The multimedia server 110 also can include one or more cache memories (not shown) that provide temporary storage of at least some program code in order to reduce the number of times program code must be retrieved from the local memory 620 and/or bulk storage device 625 during execution.

One or more network adapters 630 also can be coupled to multimedia server 110 to enable the multimedia server 110 to become coupled to other systems, computer systems, remote printers, and/or remote storage devices through intervening private or public networks. Modems, cable modems, transceivers, and Ethernet cards are examples of different types of network adapters 630 that can be used with the multimedia server 110.

As pictured in FIG. 6, the memory elements 610 can store the components of the multimedia server 110 of FIG. 1, namely the combiner 112 and the multimedia sender 122. Being implemented in the form of executable program code, these components of the multimedia server 110 can be executed by the multimedia server 110 and, as such, can be considered part of the multimedia server 110. Moreover, the combiner 112 and the multimedia sender 122 are functional data structures that impart functionality when employed as part of the multimedia server 110. The memory elements also can store, at least temporarily, the advertisements 114, the advertisement metadata 116, the program content 118, the sound data 120.

The multimedia content 124 can be output to, and stored within, the memory elements 610. As used herein, "outputting" and/or "output" can mean storing in the memory elements 610, for example, writing to a file stored in the memory elements 610, another peripheral output device, sending or transmitting to another system, exporting, or similar operations.

Figure 7:
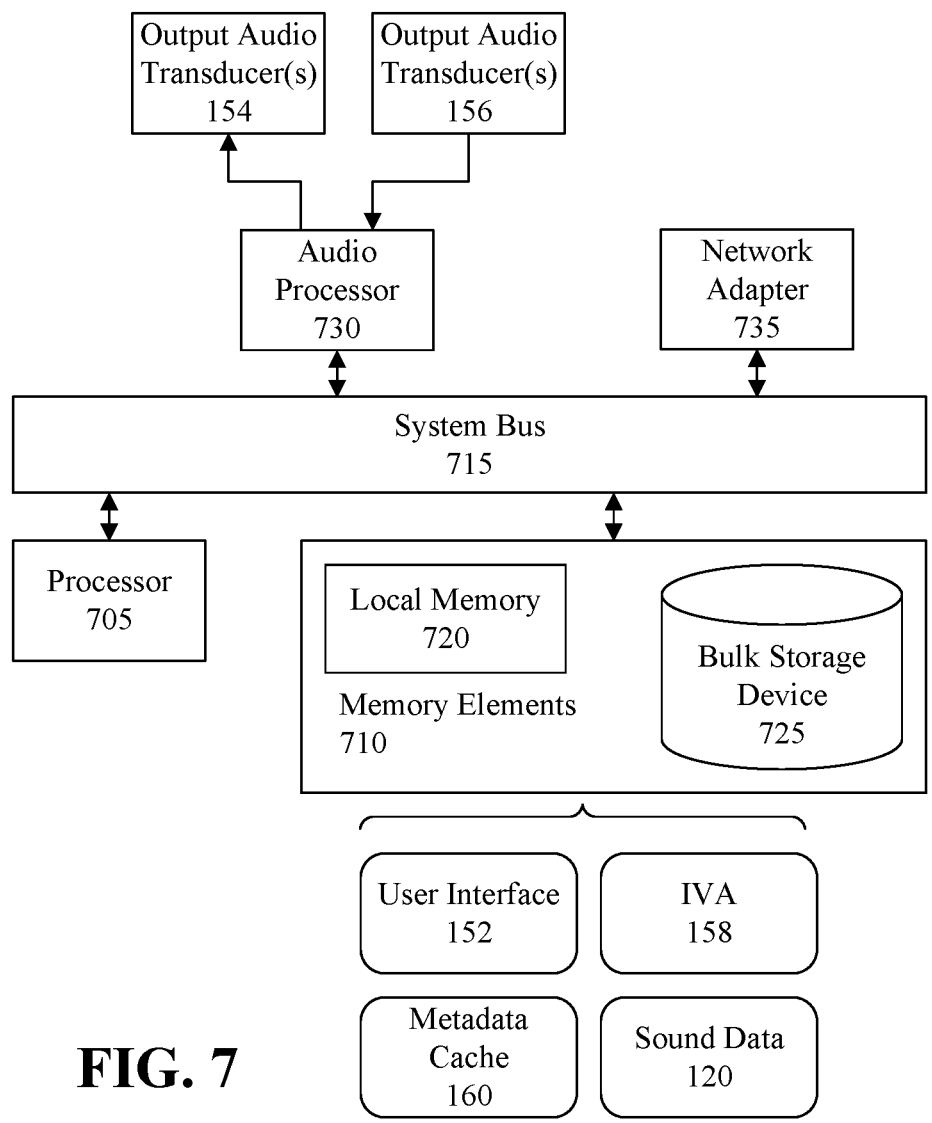
FIG. 7 is a block diagram illustrating example architecture for a client device.

FIG. 7 is a block diagram illustrating example architecture for the client device 150 of FIG. 1. The client device 150 can include at least one processor 705 (e.g., a central processing unit) coupled to memory elements 710 through a system bus 715 or other suitable circuitry. As such, the client device 150 can store program code within the memory elements 710. The processor 705 can execute the program code accessed from the memory elements 710 via the system bus 715. It should be appreciated that the client device 150 can be implemented in the form of any system including a processor and memory that is capable of performing the functions and/or operations described within this specification. The memory elements 710 can include one or more physical memory devices such as, for example, local memory 720 and one or more bulk storage devices 725.

Input/output (I/O) devices such as one or more input audio transducers 154, one or more output audio transducers 156 and, optionally, a pointing device (not shown), a keyboard (not shown) can be coupled to the client device 150. The I/O devices can be coupled to the client device 150 either directly or through intervening I/O controllers. For example, the input audio transducer(s) 154 and the output audio transducer(s) 156 can be coupled to the system bus 715 via an audio processor 730.

One or more network adapters 735 also can be coupled to client device 150 to enable the client device 150 to become coupled to other systems, computer systems, remote printers, and/or remote storage devices through intervening private or public networks. Modems, cable modems, transceivers, and Ethernet cards are examples of different types of network adapters 735 that can be used with the client device 150.

As pictured in FIG. 7, the memory elements 710 can store the components of the client device 150 of FIG. 1, namely the user interface 152, the IVA 158 and the metadata cache 160. Being implemented in the form of executable program code, the user interface 152 and the IVA 158 can be executed by the client device 150. Moreover, the user interface 152, the IVA 158, the metadata cache 160 can be considered part of the client device 150. Further, the user interface 152, the IVA 158, the metadata cache 160 are functional data structures that impart functionality when employed as part of the client device 150. The memory elements also can store, at least temporarily, the sound data 120.

Figure 8:
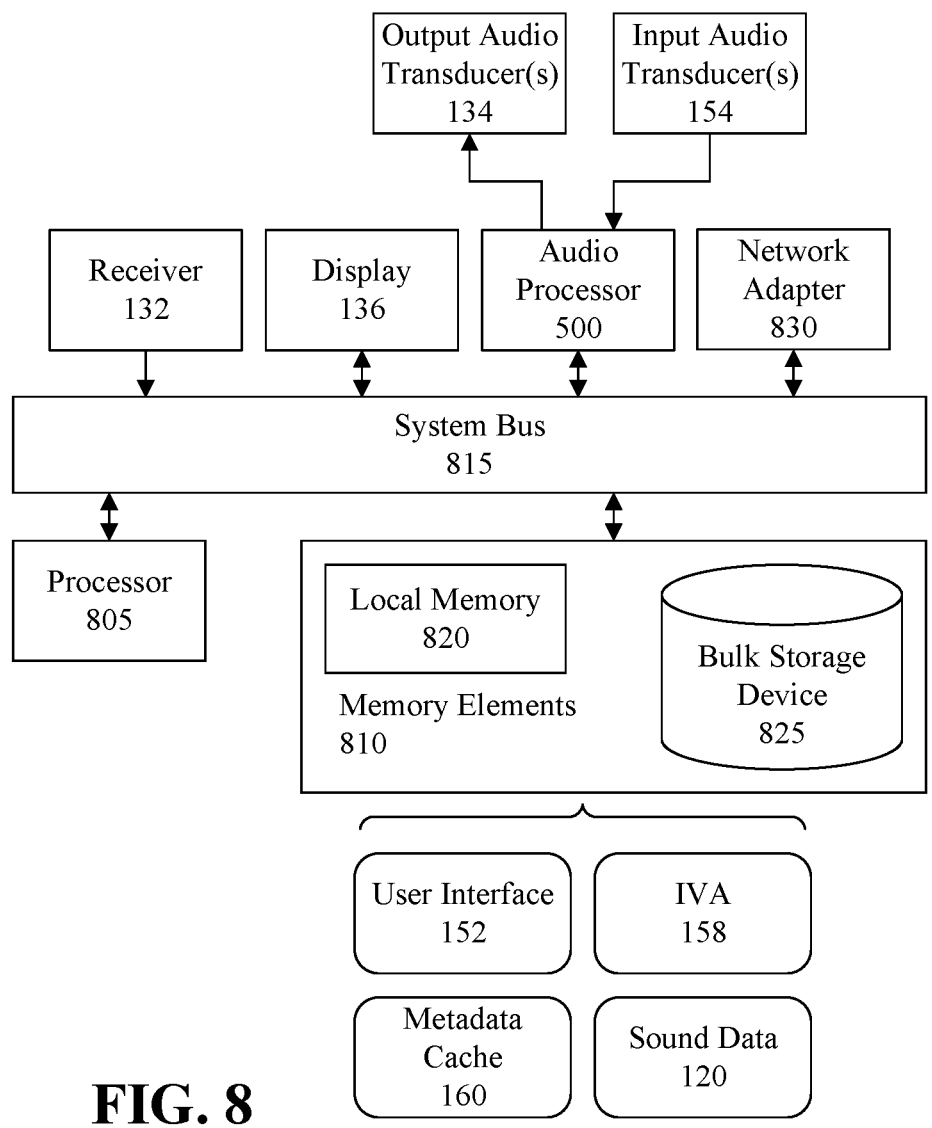
FIG. 8 is a block diagram illustrating example architecture for a media presentation device 130.

FIG. 8 is a block diagram illustrating example architecture for a media presentation device 130 of FIG. 5. The media presentation device 130 can include at least one processor 805 (e.g., a central processing unit) coupled to memory elements 810 through a system bus 815 or other suitable circuitry. As such, the media presentation device 130 can store program code within the memory elements 810. The processor 805 can execute the program code accessed from the memory elements 810 via the system bus 815. It should be appreciated that the media presentation device 130 can be implemented in the form of any system including a processor and memory that is capable of performing the functions and/or operations described within this specification. For example, the media presentation device 130 can be implemented as a television, a multimedia projection system, an audio playback system, and so on. The memory elements 810 can include one or more physical memory devices such as, for example, local memory 820 and one or more bulk storage devices 825.

Input/output (I/O) devices such as a receiver 132, a display 136 (or touchscreen), one or more input audio transducers 154, one or more output audio transducers 134 and, optionally, a pointing device (not shown), a keyboard (not shown), a remote control unit (not shown) can be coupled to the media presentation device 130. In a non-limiting arrangement, the input audio transducer(s) 154 can be a component of the remote control. The I/O devices can be coupled to the media presentation device 130 either directly or through intervening I/O controllers. For example, the input audio transducer(s) 154 and the output audio transducer(s) 156 can be coupled to the system bus 815 via an audio processor 500.

One or more network adapters 830 also can be coupled to media presentation device 130 to enable the media presentation device 130 to become coupled to other systems, computer systems, remote printers, and/or remote storage devices through intervening private or public networks. Modems, cable modems, transceivers, and Ethernet cards are examples of different types of network adapters 830 that can be used with the media presentation device 130.

As pictured in FIG. 8, the memory elements 810 can store the components of the media presentation device 130 of FIG. 1, namely the user interface 152, the IVA 158 and the metadata cache 160. Being implemented in the form of executable program code, the user interface 152 and the IVA 158 can be executed by the media presentation device 130. Moreover, the user interface 152, the IVA 158, the metadata cache 160 can be considered part of the media presentation device 130. Further, the user interface 152, the IVA 158, the metadata cache 160 are functional data structures that impart functionality when employed as part of the media presentation device 130. The memory elements also can store, at least temporarily, the sound data 120.

Figure 9:
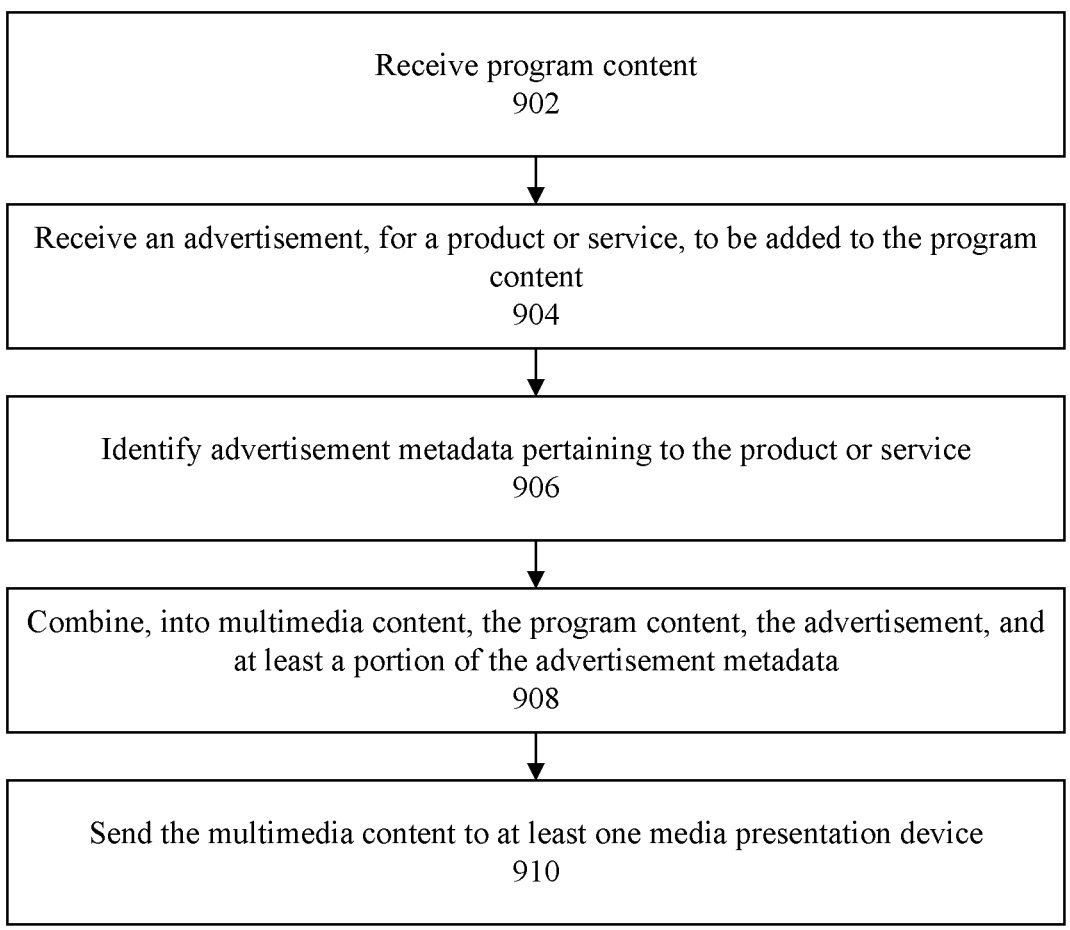
FIG. 9 is a flowchart illustrating an example of a method of sending multimedia content to a media presentation device.

FIG. 9 is a flowchart illustrating an example a method 900 of sending multimedia content to a media presentation device.

At step 902, a multimedia server 110 can receive program content.

At step 904, the multimedia server 110 can receive an advertisement, for a product or service, to be added to the program content.

At step 906, the multimedia server can identify advertisement metadata pertaining to the product or service.

At step 908, the multimedia server 110 can combine, into multimedia content, the program content, the advertisement, and at least a portion of the advertisement metadata. The portion of the metadata can be added to the multimedia content in the form of an audio signal that is not audible to a human being. For example, the multimedia server 110 can access sound data representing to the advertisement metadata, and insert the sound data as the advertisement metadata into the multimedia content. The sound data can include, for example, at least portion of the advertisement metadata that has been converted into an audio signal.

At step 910, the multimedia server can send the multimedia content to at least one media presentation device. For example, the multimedia server can send the multimedia content as a television broadcast, using cable television communications, via one or more satellites, by streaming the multimedia content over the Internet, and/or the like.

FIG. 10 is a flowchart illustrating an example of a method 1000 placing an order for a product presented in an advertisement. In the following example, various steps are indicated as being performed by a client device 150. It will be appreciated that the method 1000 also can be performed by a media presentation device 130.

At step 1002, a client device 150 can detect presentation of multimedia content comprising at least one advertisement and detect at least a portion of metadata pertaining to the at least one advertisement. As noted, the portion of the metadata pertaining to the at least one advertisement can be in the form of an audio signal that is not audible to a human being.

At step 1004, the client device 150 can store, at least temporarily, the at least the portion of metadata pertaining to the at least one advertisement to at least one memory element. For example, in an arrangement in which the metadata data is in the form of an audio signal, the client device 150 can convert the audio signal to digital data and store the digital data to a metadata cache. In another example, the client device 150 can access sound data and, using the sound data, select metadata corresponding to the audio signal.

At step 1006, the client device 150 can detect a spoken utterance of a user.

At step 1008, responsive to detecting the spoken utterance of the user, the client device 150 can derive a computer-understandable meaning of the spoken utterance by performing natural language processing on the spoken utterance.

At step 1010, the client device 150 can determine, using a processor, whether the spoken utterance pertains to a product or service indicated in the at least one advertisement by comparing the computer-understandable meaning of the spoken utterance to the at least the portion of metadata pertaining to the at least one advertisement.

At step 1012, the client device 150 can determine, using the processor, whether the computer-understandable meaning of the spoken utterance indicates that the user chooses to order the product or service indicated in the at least one advertisement.

At step 1014, responsive to determining that the spoken utterance pertains to the product or service indicated in the at least one advertisement and responsive to determining that the computer-understandable meaning of the spoken utterance indicates that the user chooses to order the product or service indicated in the at least one advertisement, the client device 150 can automatically place an order for the product or service indicated in the at least one advertisement.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

detecting presentation of multimedia content comprising at least one advertisement and detecting at least a portion of metadata pertaining to the at least one advertisement, the detecting the at least the portion of metadata comprising generating an audio signal representing the at least the portion of metadata by demodulating a communication signal carrying the at least one advertisement and the metadata into a baseband signal or performing digital to analog conversion of digital data in the communication signal carrying the at least one advertisement and the metadata;

storing, at least temporarily, the at least the portion of metadata pertaining to the at least one advertisement to at least one memory element;

detecting a spoken utterance of a user;

responsive to detecting the spoken utterance of the user, deriving a computer-understandable meaning of the spoken utterance by performing natural language processing on the spoken utterance;

determining, using a processor, whether the spoken utterance pertains to a product or service indicated in the at least one advertisement presented in the multimedia content by comparing the computer-understandable meaning of the spoken utterance to the at least the portion of metadata pertaining to the at least one advertisement;

determining whether the computer-understandable meaning of the spoken utterance indicates that the user chooses to order the product or service indicated in the at least one advertisement; and responsive to determining that the spoken utterance pertains to the product or service indicated in the at least one advertisement presented in the multimedia content and responsive to determining that the computer-understandable meaning of the spoken utterance indicates that the user chooses to order the product or service indicated in the at least one advertisement presented in the multimedia content, automatically placing an order for the product or service indicated in the at least one advertisement.

2. The method of claim 1, wherein the audio signal is not audible to a human being.

3. The method of claim 1, wherein:
the detecting presentation of multimedia content comprising the at least one advertisement and the detecting at least the portion of metadata pertaining to the at least one advertisement comprises detecting, by a client device, an acoustic signal output by a media presentation device.

4. The method of claim 1, wherein:
the detecting presentation of multimedia content comprising the at least one advertisement and the detecting at least the portion of metadata pertaining to the at least one advertisement comprises detecting, by a media presentation device, an audio signal output by an audio processor of the media presentation device.

5. The method of claim 1, wherein the at least the portion of metadata comprises an identifier uniquely identifying the product or service indicated in the at least one advertisement presented in the multimedia content.

6. The method of claim 5, wherein the at least the portion of metadata further comprises a description of the product or service.

7. The method of claim 5, wherein the at least the portion of metadata further comprises a plurality of tags assigned to the product or service.

8. A system, comprising:
a processor programmed to initiate executable operations comprising:
detecting presentation of multimedia content comprising at least one advertisement and detecting at least a portion of metadata pertaining to the at least one advertisement, the detecting the at least the portion of metadata comprising generating an audio signal representing the at least the portion of metadata by demodulating a communication signal carrying the at least one advertisement and the metadata into a baseband signal or performing digital to analog conversion of digital data in the communication signal carrying the at least one advertisement and the metadata;
storing, at least temporarily, the at least the portion of metadata pertaining to the at least one advertisement to at least one memory element;
detecting a spoken utterance of a user;
responsive to detecting the spoken utterance of the user, deriving a computer-understandable meaning of the spoken utterance by performing natural language processing on the spoken utterance;
determining whether the spoken utterance pertains to a product or service indicated in the at least one advertisement presented in the multimedia content by comparing the computer-understandable meaning of the spoken utterance to the at least the portion of metadata pertaining to the at least one advertisement;
determining whether the computer-understandable meaning of the spoken utterance indicates that the user chooses to order the product or service indicated in the at least one advertisement; and
responsive to determining that the spoken utterance pertains to the product or service indicated in the at least one advertisement presented in the multimedia content and responsive to determining that the computer-understandable meaning of the spoken utterance indicates that the user chooses to order the product or service indicated in the at least one advertisement presented in the multimedia content, automatically placing an order for the product or service indicated in the at least one advertisement.

9. The system of claim 8, wherein the audio signal is not audible to a human being.

10. The system of claim 8, wherein:
the detecting presentation of multimedia content comprising the at least one advertisement and the detecting at least the portion of metadata pertaining to the at least one advertisement comprises detecting, by a client device, an acoustic signal output by a media presentation device.

11. The system of claim 8, wherein:
the detecting presentation of multimedia content comprising the at least one advertisement and the detecting at least the portion of metadata pertaining to the at least one advertisement comprises detecting, by a media presentation device, an audio signal output by an audio processor of the media presentation device.

12. The system of claim 8, wherein the at least the portion of metadata comprises an identifier uniquely identifying the product or service indicated in the at least one advertisement presented in the multimedia content.

13. The system of claim 12, wherein the at least the portion of metadata further comprises a description of the product or service.

14. The system of claim 12, wherein the at least the portion of metadata further comprises a plurality of tags assigned to the product or service.

15. A computer program product, comprising:
one or more computer readable storage mediums having program code stored thereon, the program code stored on the one or more computer readable storage mediums collectively executable by a data processing system to initiate operations including:
detecting presentation of multimedia content comprising at least one advertisement and detecting at least a portion of metadata pertaining to the at least one advertisement, the detecting the at least the portion of metadata comprising generating an audio signal representing the at least the portion of metadata by demodulating a communication signal carrying the at least one advertisement and the metadata into a baseband signal or performing digital to analog conversion of digital data in the communication signal carrying the at least one advertisement and the metadata;
storing, at least temporarily, the at least the portion of metadata pertaining to the at least one advertisement to at least one memory element;
detecting a spoken utterance of a user;
responsive to detecting the spoken utterance of the user, deriving a computer-understandable meaning of the spoken utterance by performing natural language processing on the spoken utterance;
determining whether the spoken utterance pertains to a product or service indicated in the at least one advertisement presented in the multimedia content by comparing the computer-understandable meaning of the spoken utterance to the at least the portion of metadata pertaining to the at least one advertisement;
determining whether the computer-understandable meaning of the spoken utterance indicates that the user chooses to order the product or service indicated in the at least one advertisement; and
responsive to determining that the spoken utterance pertains to the product or service indicated in the at least one advertisement presented in the multimedia content and responsive to determining that the computer-understandable meaning of the spoken utterance indicates that the user chooses to order the product or service indicated in the at least one advertisement presented in the multimedia content, automatically placing an order for the product or service indicated in the at least one advertisement.

16. The computer program product of claim 15, wherein the audio signal is not audible to a human being.

17. The computer program product of claim 15, wherein:
the detecting presentation of multimedia content comprising the at least one advertisement and the detecting at least the portion of metadata pertaining to the at least one advertisement comprises detecting, by a client device, an acoustic signal output by a media presentation device.

18. The computer program product of claim 15, wherein:
the detecting presentation of multimedia content comprising the at least one advertisement and the detecting at least the portion of metadata pertaining to the at least one advertisement comprises detecting, by a media presentation device, an audio signal output by an audio processor of the media presentation device.

19. The computer program product of claim 15, wherein the at least the portion of metadata comprises an identifier uniquely identifying the product or service indicated in the at least one advertisement presented in the multimedia content.

20. The computer program product of claim 19, wherein the at least the portion of metadata further comprises a description of the product or service.

\* \* \* \* \*